United States Patent
Vasekin et al.

(10) Patent No.: US 9,645,824 B2
(45) Date of Patent: May 9, 2017

(54) BRANCH TARGET ADDRESS CACHE USING HASHED FETCH ADDRESSES

(71) Applicant: ARM Limited, Cambridge (GB)

(72) Inventors: Vladimir Vasekin, Cambridge (GB); Allan John Skillman, Cambridge (GB); Chiloda Ashan Senerath Pathirane, Cambridge (GB); Jean-Baptiste Brelot, Cambridge (GB)

(73) Assignee: ARM Limited, Cambridge (GB)

( * ) Notice: Subject to any disclaimer, the term of this patent is extended or adjusted under 35 U.S.C. 154(b) by 890 days.

(21) Appl. No.: 13/664,659

(22) Filed: Oct. 31, 2012

(65) Prior Publication Data
US 2014/0122846 A1 May 1, 2014

(51) Int. Cl.
*G06F 9/38* (2006.01)
(52) U.S. Cl.
CPC ................... *G06F 9/3806* (2013.01)
(58) Field of Classification Search
CPC .................................................. G06F 9/3806
USPC .......................................................... 712/238
See application file for complete search history.

(56) References Cited

U.S. PATENT DOCUMENTS

| | | | | |
|---|---|---|---|---|
| 5,574,871 A * | 11/1996 | Hoyt | ................... | G06F 9/30054 712/200 |
| 6,651,162 B1 * | 11/2003 | Levitan | ................ | G06F 9/3806 712/206 |
| 7,069,268 B1 * | 6/2006 | Burns | .................... | H04L 45/00 707/770 |
| 8,750,370 B2 * | 6/2014 | Nagapudi | ............ | H04L 45/745 375/240.02 |
| 2009/0198985 A1 * | 8/2009 | Levenstein | .......... | G06F 9/3844 712/240 |
| 2011/0113223 A1 * | 5/2011 | Cavanna | ................ | G06F 9/455 712/238 |
| 2014/0334489 A1 * | 11/2014 | Bosshart | .............. | H04L 45/745 370/392 |

OTHER PUBLICATIONS

Shen et al., "Modern Processor Design—Fundamentals of Superscalar Processors," Beta ed., 2002, McGraw-Hill Companies, Inc., pp. 12-13, 32, 37-43, 53-69, 139-43.*
Vandierendonck et al., "XOR-based hash functions," Jul. 2005, IEEE Transactions on Computers, vol. 54, Issue 7, pp. 800-812.*

* cited by examiner

*Primary Examiner* — Yuqing Xiao
(74) *Attorney, Agent, or Firm* — Nixon & Vanderhye P.C.

(57) ABSTRACT

An integrated circuit incorporates prefetch circuitry for prefetching program instructions from a memory. The prefetch circuitry includes a branch target address cache. The branch target address cache stores data indicative of branch target addresses of previously encountered branch instructions fetched from the memory. For each previously encountered branch instructions, the branch target address cache stores a tag value indicative of a fetch address of that previously encountered branch instruction. The tag values stored are generated by tag value generating circuitry which performs a hashing function upon a portion of the fetch address such that the tag value has a bit length less than the bit length of the portion of the fetch address concerned.

14 Claims, 4 Drawing Sheets

BRANCH TARGET ADDRESS CACHE USING HASHED FETCH ADDRESSES

BACKGROUND

This invention relates to the field of data processing systems. More particularly, this invention relates to branch target address caches for use within data processing systems.

It is known to provide branch target address caches coupled to prefetch circuitry within data processing systems to identify branch instructions early in the instruction pipeline and redirect instruction prefetching to predicted branch targets for those branch instructions. Known branch target address caches store the addresses of previously encountered branch instructions together with the target addresses for those previously encountered branch instructions. Accordingly, when a program instruction is fetched from a memory address matching a memory address stored within the branch target address cache from which a branch instruction has been previously fetched, then data identifying the branch target address can be read from the branch target address cache and used to redirect prefetching operations to the branch target.

In order to increase the effectiveness of a branch target address cache, it is desirable that it should have capacity to store data relating to a large number of previously encountered branch instructions. However, while providing a greater storage capacity to the branch target address cache increases the effectiveness with which it may identify previously encountered branch instructions, it has the disadvantage of increasing the amount of circuit overhead in terms of area and power consumption that is associated with the maintenance and operation of the branch target address cache.

SUMMARY

Viewed from one aspect the present invention provides an apparatus for processing data comprising:

prefetch circuitry configured to prefetch from a sequence of addresses within a memory program instructions to be executed;

a branch target address cache coupled to said prefetch circuitry and configured to store:

(i) branch target data indicative of branch target addresses of previously encountered branch instructions fetched from said memory; and (ii) for each of said previously encountered branch instructions, a tag value indicative of a fetch address of said previously encountered branch instruction; and tag value generating circuitry configured to generate said tag value by performing a hashing function upon a portion of said fetch address, said tag value having bit length less than a bit length of said portion of said fetch address.

A hashing function has the effect of mapping multiple fetch addresses to the same tag value. This creates aliasing effects by which a tag value generated from a fetch address may match a tag value generated from a previously encountered branch instruction fetched from a different address. Such an incorrect identification of a branch instruction will result in an inappropriate redirection of instruction prefetching that will waste energy and may impact performance. Despite the forming of the tag value using a hashing function appearing at first sight to be a bad idea, in practice it can produce overall gains. The tag values stored in place of fetch addresses are smaller and so require less storage capacity within the branch target address cache. This produces a reduction in circuit overhead and power consumption. As fewer bit values need to be compared when performing comparisons between the tag values which are shorter than the full addresses, energy is also saved in this way. Furthermore, in real life operation of a data processing system, most branches are relatively short and the memory addresses to be fetched tend to be located relatively close to one another. Accordingly, aliasing introduced by the hashing function with fetch addresses that are a long way from the current execution point within the memory address space are statistically unlikely to arise. Accordingly, the disadvantages that would normally prejudice against using a tag value derived with a hashing function from the fetch addresses are in practice less than would be expected and thus an overall gain may be made as the overhead and energy advantages associated with the storage and use of the shorter tag values outweigh the potential aliasing issues.

It will be appreciated that the hashing function can take a wide variety of different forms. Appropriate selection of the hashing function being used can serve to reduce the probability of inappropriate aliasing resulting in the incorrect identification of branch instructions whilst providing tag values having an advantageously short bit length. In some embodiments each bit of the tag value is dependent upon a different subset of bits taken from the fetch address, with at least one bit of the tag value being dependent upon a plurality of bits of the fetch address. With multiple bits of the fetch address controlling a single tag value, this can shorten the tag value.

In some embodiments at least one bit of the tag value is dependent upon a single of bit of the fetch address. Bits of the fetch address which discriminate between instructions which are close together within the memory address space may be used to control an individual tag value bit on a one-to-one basis in order to reduce the likelihood of aliasing between fetch addresses which are close together in the address space.

In some embodiments the subsets of bits of the fetch address upon which the different tag value bits are dependent may be pairwise disjoint subsets (non-overlapping). This assists in reducing aliasing.

The previously encountered branch instructions which are stored within the branch target address cache will have a given statistical distribution of fetch addresses within the memory address space. The hashing function may be selected to be dependent upon the bits of the fetch address so as to reduce the probability of two different fetch addresses within the statistical distribution of fetch addresses generating the same tag value when compared with a random dependence of each bit upon a different subset of the fetch address. Thus, the hashing function may be selected to take account of the statistical distribution of fetch addresses stored within a branch target address cache so as to reduce the likelihood of aliasing between addresses that are within a typical range of memory addresses that would be likely to be stored within the branch target address cache and traversed by a program at any given time. In some embodiments the hashing function may be selected so as to minimise the probability of such aliasing.

In some embodiments the hashing function may be made software programmable. As an example, profiling of the code to be executed could be performed in advance to determine a hashing function which produces a low level of aliasing within the branch target address cache. Such a hashing function could then be software programmed for use by the tag value generating circuitry.

It will be appreciated that the hashing function could take a wide variety of different forms. In some embodiments the hashing function is such that each bit of the tag value is dependent upon a parity of a different subset of bits of the fetch address.

In some embodiments the hashing function operates on a plurality of contiguous fields each formed of contiguous bits of the fetch address. A first of these fields may be selected so as to correspond to the lowest order bits used within the fetch address for forming the tag value. The further contiguous fields may form a sequence with a monotonic decrease in the length of the field and with the highest order bits within the tag value being dependent upon bits taken from a largest number of the contiguous fields. In this way there will tend to be more aliasing between high order bits of the fetch address and less aliasing between the low order bits.

The real life situation is one in which the branch target address cache is likely to contain data concerning previously encountered branch instructions that are relatively close together within the memory address space. This is well suited to this type of hashing function as aliasing between widely spaced fetch addresses within the memory address space is less likely to be a concern.

The branch target address cache may be conveniently located within a prefetch stage of a multi-stage instruction pipeline.

The hashing function whilst adding some delay to the operation of the branch target address cache may, with appropriate choice of a hashing function, be such that the generation of the target address to be prefetched, the performing of the hashing function and the lookup within the branch target address cache can all occur within the same clock cycle. Thus, the use of the hashing function need not adversely impact upon what is typically a critical path within the prefetch circuitry.

Viewed from another aspect the present invention provides apparatus for processing data comprising:

prefetch means for prefetching from a sequence of addresses within a memory program instructions to be executed;

branch target address cache means, coupled to said prefetch means, for storing:

(i) branch target data indicative of branch target addresses of previously encountered branch instructions fetched from said memory; and (ii) for each of said previously encountered branch instructions, a tag value indicative of a fetch address of said previously encountered branch instruction; and tag value generating means for generating said tag value by performing a hashing function upon a portion of said fetch address, said tag value having bit length less than a bit length of said portion of said fetch address.

Viewed from a further aspect the present invention provides a method of processing data comprising the steps of:

prefetching from a sequence of addresses within a memory program instructions to be executed;

storing within a branch target address cache:

(i) branch target data indicative of branch target addresses of previously encountered branch instructions fetched from said memory; and (ii) for each of said previously encountered branch instructions, a tag value indicative of a fetch address of said previously encountered branch instruction; and generating said tag value by performing a hashing function upon a portion of said fetch address, said tag value having bit length less than a bit length of said portion of said fetch address.

The above, and other objects, features and advantages of this invention will be apparent from the following detailed description of illustrative embodiments which is to be read in connection with the accompanying drawings.

DESCRIPTION OF EXAMPLE EMBODIMENTS

Figure 1:
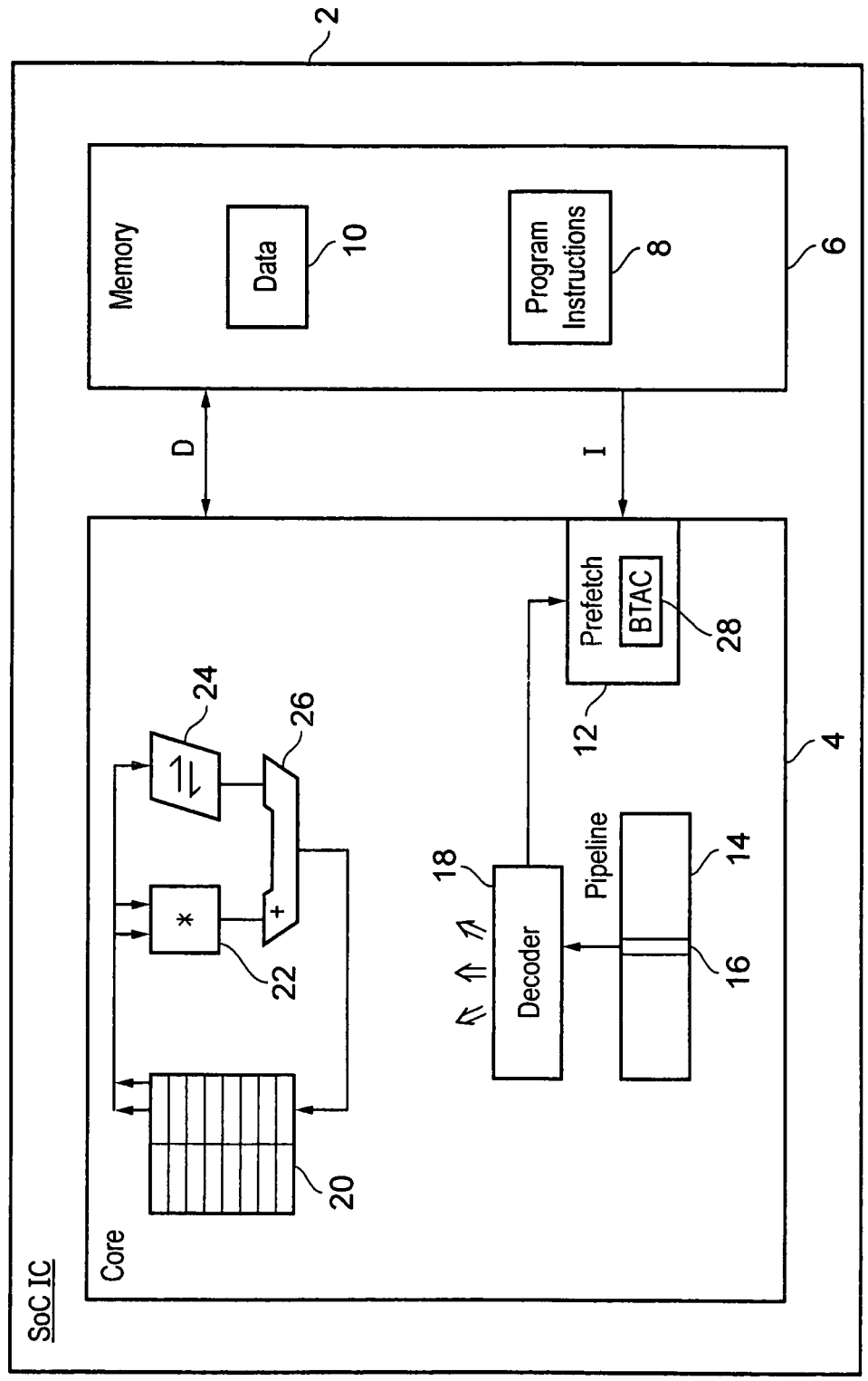
FIG. 1 schematically illustrates an apparatus for processing data in the form of a system-on-chip integrated circuit that incorporates a branch target address cache.

FIG. 1 schematically illustrates an apparatus for processing data in the form of a system-on-chip integrated circuit 2. The integrated circuit 2 includes a processor core 4 and a memory 6. The memory 6 has a memory address space and stores program instructions 8 and data 10 to be processed. The processor core 4 includes prefetch circuitry 12 arranged to prefetch from a sequence of fetch addresses within the memory address space of the memory 2 program instructions to be executed by the processor core 4. These prefetched program instructions are supplied to an instruction pipeline 14 along which they progress. At a decode stage 16 within the instruction pipeline 14, the instructions are decoded by an instruction decoder 18 and generate control signals which serve to configure and control processing circuitry such as a register bank 20, a multiplier 22, a shifter 24 and an adder 26. The decoder 18 may feedback to the prefetch circuitry 12 an indication of the decoding of a branch instruction. This can be used to load entries into a branch target address cache 28 within the prefetch circuitry 12.

The branch target address cache 28 serves to store branch target data indicative of branch target addresses of previously encountered branch instructions fetched from the memory 6. For each of these previously encountered branch instructions, the branch target address cache 28 stores a tag value which indicates the fetch address of that previously encountered branch instruction. When an instruction is fetched a second time from that fetch address (assuming no intervening cache flush), then this may be identified by a tag value match and an early identification of the fetched instruction as a branch instruction can be made. This early identification takes place prior to the decoding of the fetched instruction and serves to provide an early redirection of the prefetching operation of the prefetch circuitry 12. If an incorrect identification of a branch instructions is made by the branch target address cache 28, then this can be fed back to the branch target address cache 28 from the decoder 18 and used to flush or otherwise modify the entry within the branch target address cache 28.

Figure 2:
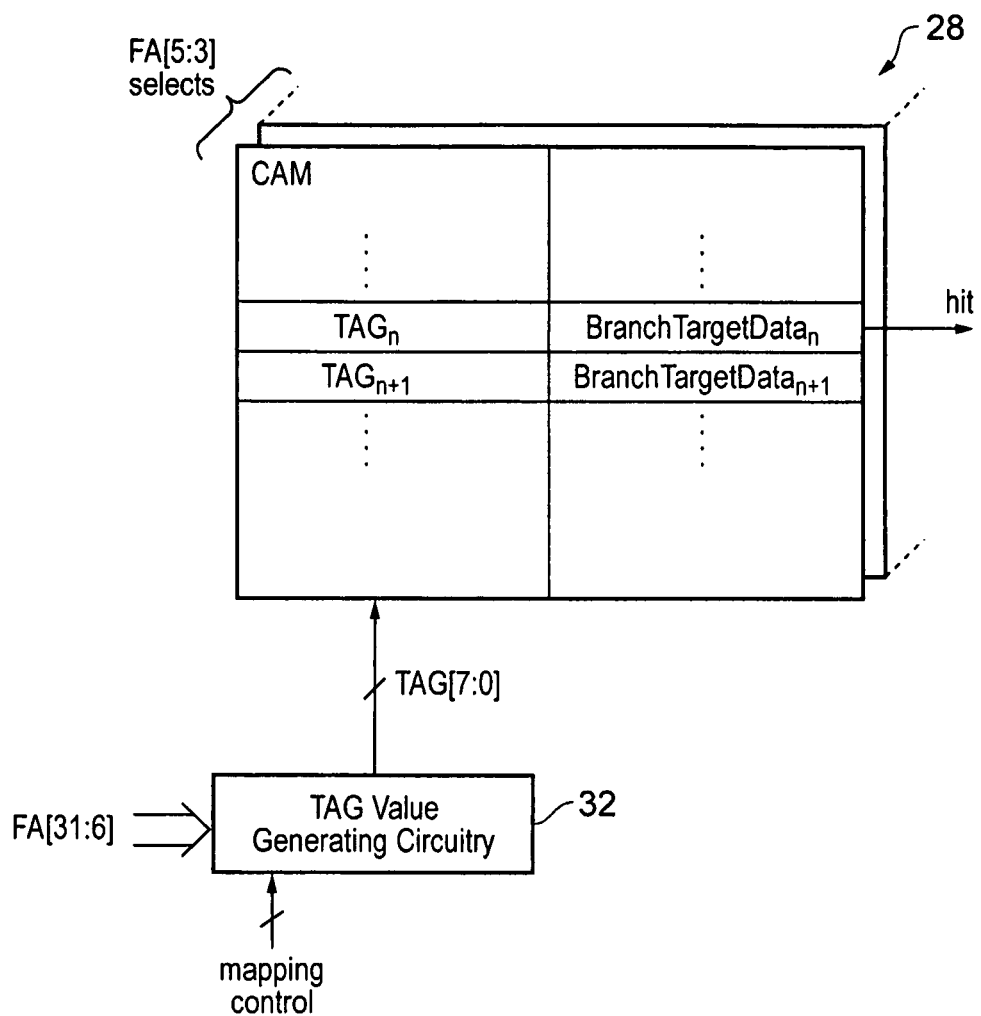
FIG. 2 schematically illustrates a branch target address cache.

FIG. 2 schematically illustrates a branch target address cache 28 in more detail. In this example the cache contains multiple cache ways between which a selection is made using bits FA[5:3] of the fetch address. The instructions are fetched in 64-bit blocks and accordingly the least significant three bits of the fetch address are not significant in the operation of the branch target address cache. Tag value generating circuitry 32 serves to receive high order bits of the fetch address FA[31:6] currently being prefetched and to generate, using a hashing function, a tag value TAG[7:0] from these bits of the fetch address. The tag value is then supplied to the selected way within the branch target address cache 28 and compared with all of the stored tag values within that way. The way is a content addressable memory. If the tag value output from the tag value generating circuitry 32 matches one of the stored tag values, then a hit is detected and branch target data indicative of a branch target address of a previously encountered branch instruction is output from the branch target address cache 28.

As illustrated, the tag value generating circuitry 32 receives mapping control signals which serve to alter the hashing function applied by the tag value generating circuitry 32. These mapping control signals may be software generated, such as, for example, following code profiling. In practice, only a small change, such as the remapping of two bits of the fetch address into the hashing function, may be sufficient to avoid pathological situations in which the collision rate increases above a desired threshold level.

Figure 3:
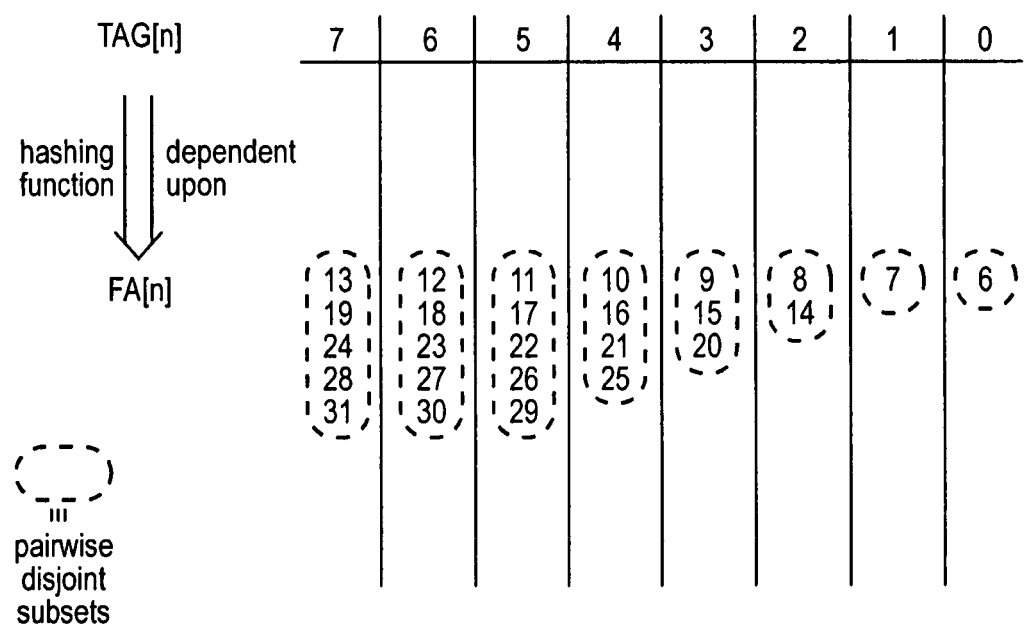
FIG. 3 schematically illustrates an example hashing function used to generate a tag value.

FIG. 3 schematically illustrates one example of a hashing function that may be used. The tag value generated is an eight bit tag value. Bits FA[31:6] of the fetch address are used as inputs to the hashing function. Each bit of the tag value is dependent upon a subset of bits of the fetch address. As an example, TAG[0] is dependent upon only FA[6]. Conversely, TAG[6] is dependent upon a subset of bits of the fetch address namely bits 12, 18, 23, 27 and 30. Each bit of the tag value is dependent upon a different subset of bits of the fetch address. These subsets are pairwise disjoint subsets, i.e. non-overlapping. Some of the subsets contain only a single bit. Other of the subsets contain up to five bits of the fetch address in this example.

Moving from the lowest order bit position to the highest order bit position within the tag value, the corresponding subsets of bits within the fetch address upon which those bits of the tag value depend increase monotonically in their number of elements as is illustrated in FIG. 3. Thus, the highest order bits of the tag value are dependent upon five bits within the fetch address. Conversely, both the two lowest order bits within the tag value are separately dependent upon individual bits within the fetch address. This form of hashing function provides a desirably low level of aliasing between fetch addresses for the likely statistical distribution of fetch addresses to be used when executing a program around a current execution point. This is based upon the property that branches tend to be relatively short in length and so a program will tend to execute within a relatively narrow band of fetch addresses, with this band shifting relatively slowly over time. Thus, a hashing function which provides less aliasing between lower order bits of the fetch address will tend to suffer from a lower rate of aliasing when typical programs are executed.

Returning to FIG. 3 it will be seen that the fetch address may be considered to be formed of a plurality of contiguous fields each formed of contiguous bits of the fetch address. A first of these fields is FA[13:6] The remaining fields in this example are FA[19:14], FA[24:20], FA[28:25] and FA[31:29]. The hashing function applied by the tag value generating circuitry 32 is formed so that higher order bits within the tag value are dependent upon bits taken from a larger number of the fields within the fetch address. As illustrated, higher order bits within the tag value depend upon higher order bits within the respective fields in turn.

Figure 4:
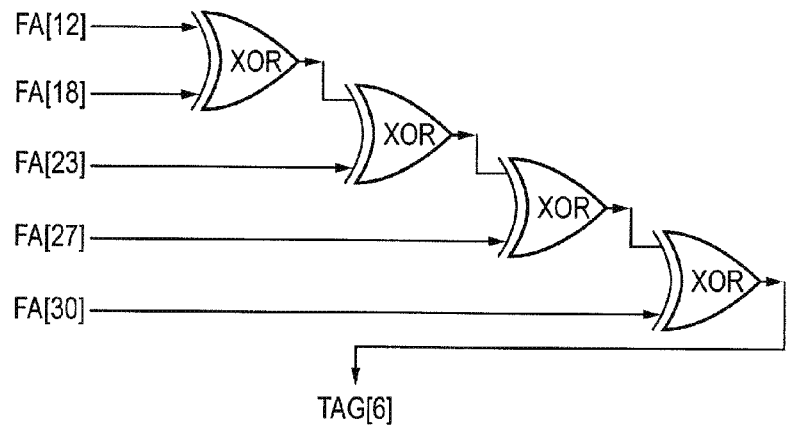
FIG. 4 schematically illustrates circuitry for performing part of a hashing function.

FIG. 4 schematically illustrate a circuit which performs part of the hashing function illustrated in FIG. 3. In this example, the bit of the tag value being generated is TAG[6]. As will be seen, this bit of the tag value is dependent upon bits 12, 18, 23, 27 and 30 of the fetch address. These bits of the fetch address are supplied as inputs to a cascading sequence of XOR gates which in turn generate a value representing a parity of the combination of bits of the fetch address. It will be appreciated that many different forms of hashing function may be used and the above examples are given merely by way of illustration and do not restrict the generality of the present techniques.

Figure 5:
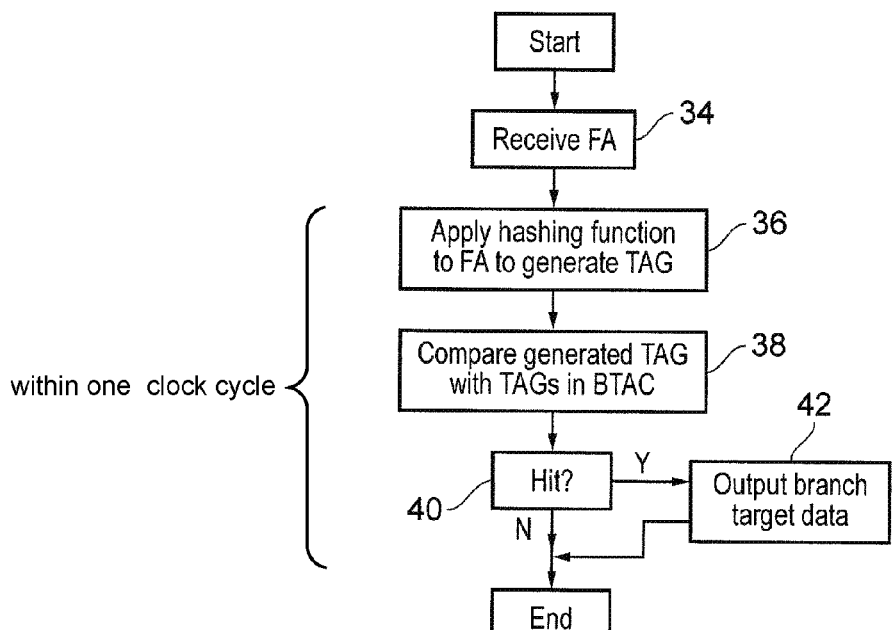
FIG. 5 is a flow diagram schematically illustrating the operation of the branch target address of FIG. 2.

FIG. 5 is a flow diagram schematically illustrating the operation of the branch target address cache 12. At step 34 a fetch address is received indicating a block of program instructions currently being fetched. At step 36 the tag value generating circuitry 32 applies the currently selected hashing function to the fetch address to generate a tag value. At step 38 this generated tag value is compared with the stored tag values of previously encountered branch instructions within the currently selected way of the branch target address cache. Step 40 determines whether or not there is a hit within the selected way of the branch target address cache. If there is a hit, then step 42 serves to output branch target data indicating the branch address of the previously encountered branch target instruction corresponding to that hit. This branch target address may then be used as the next address from which instructions are prefetched. If there is no hit detected at step 40, then step 42 is bypassed.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
   prefetch circuitry configured to prefetch from a sequence of addresses within a memory program instructions to be executed;
   a branch target address cache coupled to said prefetch circuitry and configured to store:
      branch target data indicative of branch target addresses of previously encountered branch instructions fetched from said memory; and
      for each of said previously encountered branch instructions, a tag value indicative of a fetch address of said previously encountered branch instruction; and
   tag value generating circuitry configured to generate said tag value by performing a hashing function upon a portion of said fetch address, said tag value having bit length less than a bit length of said portion of said fetch address;
   wherein the branch target address cache is configured to detect a hit for the branch target data associated with one of said previously encountered branch instructions when a tag value generated by the tag value generating circuitry by performing the hashing function upon a portion of said fetch address is detected to match the tag value stored in the branch target address cache for said one of said previously encountered branch instructions, even if said one of said previously encountered branch instructions was fetched from a different address to said fetch address, wherein said hashing function operates upon a plurality of contiguous fields of contiguous bits of said fetch address, and wherein a first field of said plurality of contiguous fields has a lowest bit order within said fetch address of said plurality of contiguous fields and comprises a number of bits equal to a number of bits of said tag value and each bit in descending bit order within said tag value is dependent upon a bit within said first field following a descending bit order within said fetch address.

2. The apparatus as claimed in claim 1, wherein said hashing function generates said tag value such that each bit of said tag value is dependent upon a different subset of bits of said fetch address and at least one bit of said tag value is dependent upon a plurality of bits of said fetch address.

3. The apparatus as claimed in claim 2, wherein at least one bit of said tag value is dependent upon a single of bit of said fetch address.

4. The apparatus as claimed in claim 2, wherein different bits of said tag value are dependent upon respective ones of a plurality of different subsets of bits of said fetch address and said plurality of different subsets are pairwise disjoint.

5. The apparatus as claimed in claim 2, wherein said previously encountered branch instructions have a given statistical distribution of fetch addresses within said memory and said hashing function is dependent upon said bits of said fetch address to reduce a probability of two different fetch addresses of branch instructions within said statistical distribution of fetch addresses generating a same tag value compared with an average of a random dependence of each bit of said tag value upon a different subset of bits of said fetch address.

6. The apparatus as claimed in claim 2, wherein said previously encountered branch instructions have a given statistical distribution of fetch addresses within said memory and said hashing function is dependent upon said bits of said fetch address substantially to minimise a probability of two different fetch addresses of branch instructions within said statistical distribution of fetch addresses generating a same tag value.

7. The apparatus as claimed in claim 1, wherein said hashing function is software programmable.

8. The apparatus as claimed in claim 1, wherein each bit of said tag value is dependent upon a parity of a different subset of bits of said fetch address.

9. The apparatus as claimed in claim 1, further comprising a multi-stage instruction pipeline including an instruction prefetch stage that includes the prefetch circuitry and wherein said branch target address cache is part of said instruction prefetch stage.

10. The apparatus as claimed in claim 1, wherein performing said hashing function upon said fetch address and a lookup within said branch target address cache all occur within one clock cycle of a clock signal controlling said apparatus.

11. Apparatus for processing data comprising:
prefetch circuitry configured to prefetch from a sequence of addresses within a memory program instructions to be executed;
a branch target address cache coupled to said prefetch circuitry and configured to store:
  branch target data indicative of branch target addresses of previously encountered branch instructions fetched from said memory; and
  for each of said previously encountered branch instructions, a tag value indicative of a fetch address of said previously encountered branch instruction; and tag value generating circuitry configured to generate said tag value by performing a hashing function upon a portion of said fetch address, said tag value having bit length less than a bit length of said portion of said fetch address;
wherein said hashing function generates said tag value such that each bit of said tag value is dependent upon a different subset of bits of said fetch address and at least one bit of said tag value is dependent upon a plurality of bits of said fetch address;
wherein said hashing function operates upon a plurality of contiguous fields of contiguous bits of said fetch address; and
wherein a first field of said plurality of contiguous fields has a lowest bit order within said fetch address of said plurality of contiguous fields and comprises a number of bits equal to a number of bits of said tag value and each bit in descending bit order within said tag value is dependent upon a bit within said first field following a descending bit order within said fetch address.

12. The apparatus as claimed in claim 11, wherein:
said plurality of contiguous fields comprises a sequence, in ascending bit order within said fetch address, of N further fields each comprising X bits, where X monotonically decreases as N increases and N is a positive integer greater than one; and
for each one of said N further fields, a highest order X bits of said tag value in descending bit order are each dependent upon a respective bit within said one of said N further fields following a descending order within said fetch address.

13. The apparatus for processing data comprising:
prefetch means for prefetching from a sequence of addresses within a memory program instructions to be executed;
means, coupled to said prefetch means, for storing:
  branch target data indicative of branch target addresses of previously encountered branch instructions fetched from said memory; and
  for each of said previously encountered branch instructions, a tag value indicative of a fetch address of said previously encountered branch instruction; and
tag value generating means for generating said tag value by performing a hashing function upon a portion of said fetch address, said tag value having bit length less than a bit length of said portion of said fetch address;
wherein the means for storing is configured to detect a hit for the branch target data associated with one of said previously encountered branch instructions when a tag value generated by the tag value generating means by performing the hashing function upon a portion of said fetch address is detected to match the tag value stored in the means for storing for said one of said previously encountered branch instructions, even if said one of said previously encountered branch instructions was fetched from a different address to said fetch address,
wherein said hashing function operates upon a plurality of contiguous fields of contiguous bits of said fetch address, and
wherein a first field of said plurality of contiguous fields has a lowest bit order within said fetch address of said plurality of contiguous fields and comprises a number of bits equal to a number of bits of said tag value and each bit in descending bit order within said tag value is dependent upon a bit within said first field following a descending bit order within said fetch address.

14. A method of processing data comprising the steps of:
prefetching from a sequence of addresses within a memory program instructions to be executed;
storing within a branch target address cache:
- branch target data indicative of branch target addresses of previously encountered branch instructions fetched from said memory; and
- for each of said previously encountered branch instructions, a tag value indicative of a fetch address of said previously encountered branch instruction; and generating said tag value by performing a hashing function upon a portion of said fetch address, said tag value having bit length less than a bit length of said portion of said fetch address; and detecting a hit in the branch target address cache for the branch target data associated with one of said previously encountered branch instructions when a tag value generated by performing the hashing function upon a portion of said fetch address is detected to match the tag value stored in the branch target address cache for said one of said previously encountered branch instructions, even if said one of said previously encountered branch instructions was fetched from a different address to said fetch address, wherein said hashing function operates upon a plurality of contiguous fields of contiguous bits of said fetch address, and wherein a first field of said plurality of contiguous fields has a lowest bit order within said fetch address of said plurality of contiguous fields and comprises a number of bits equal to a number of bits of said tag value and each bit in descending bit order within said tag value is dependent upon a bit within said first field following a descending bit order within said fetch address.

* * * * *